Dec. 14, 1937.   N. H. BROCK   2,101,979
STEREOSCOPIC PHOTOGRAPHY
Original Filed Feb. 6, 1933   3 Sheets-Sheet 1

INVENTOR.
NORMAN H. BROCK
BY John E. Hubbell
ATTORNEY.

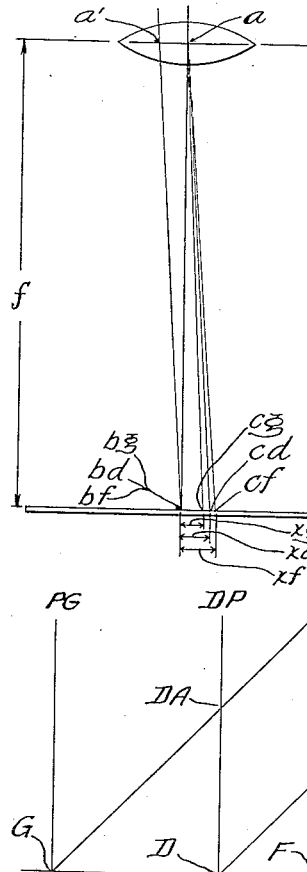
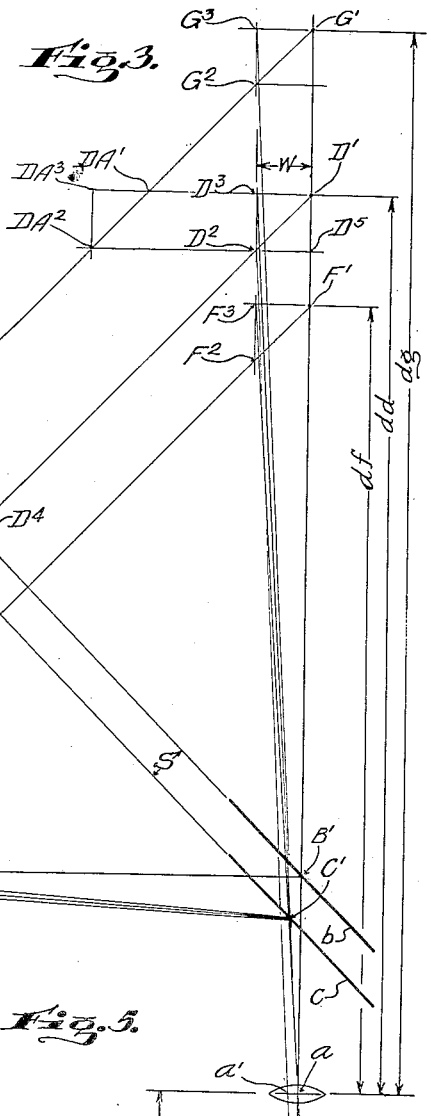
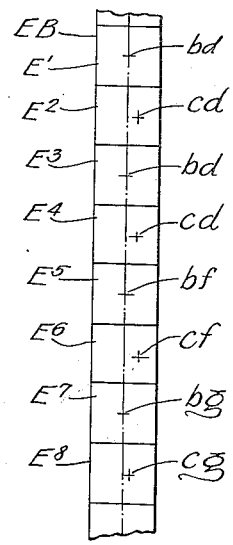
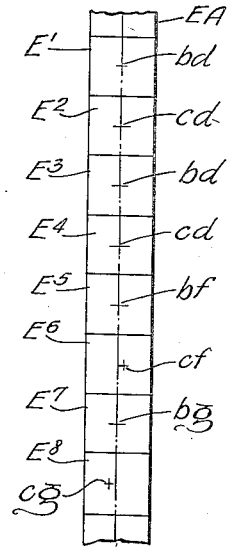
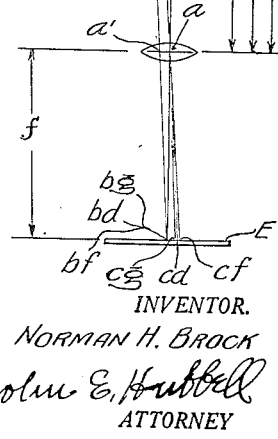

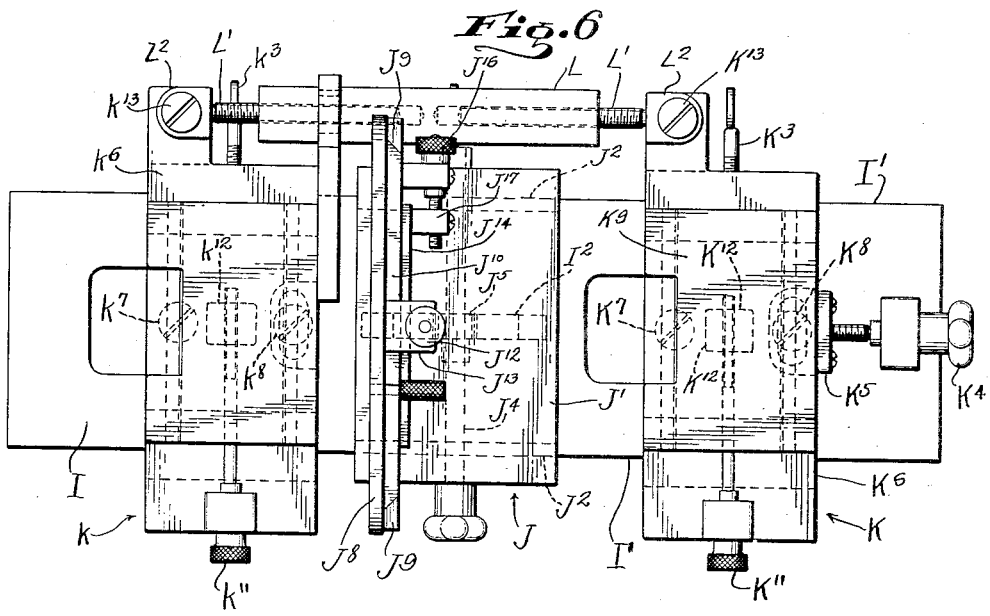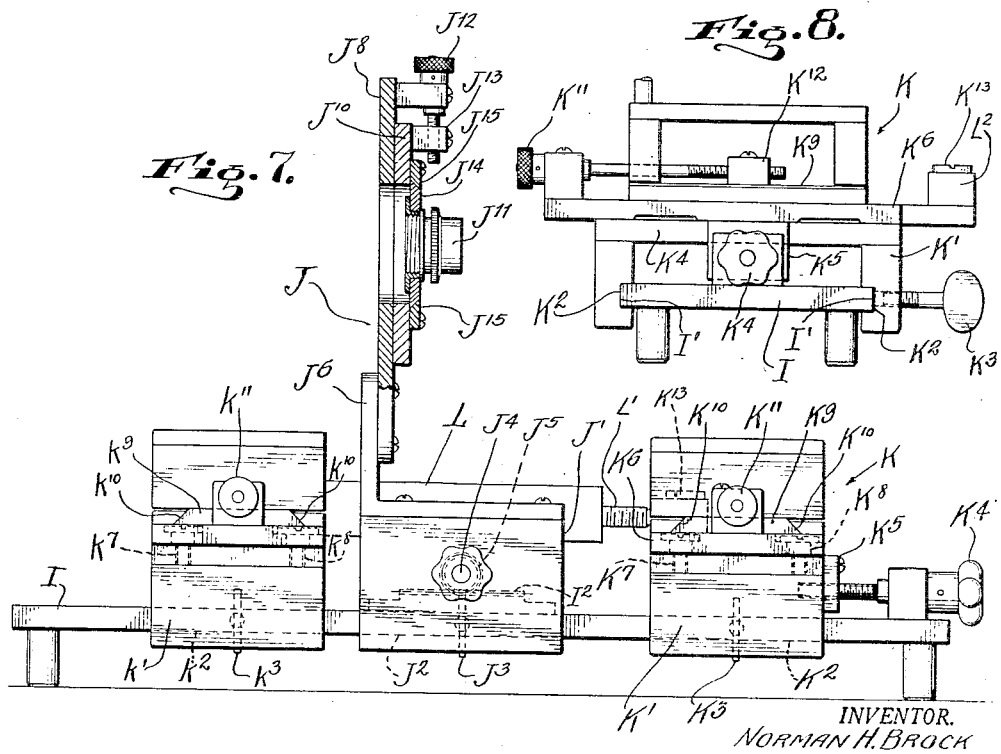

Patented Dec. 14, 1937

2,101,979

UNITED STATES PATENT OFFICE 2,101,979

STEREOSCOPIC PHOTOGRAPHY

Norman H. Brock, Philadelphia, Pa.

Application February 6, 1933, Serial No. 655,360
Renewed May 8, 1937

5 Claims. (Cl. 88—16.6)

The general object of the present invention is to provide improved photographic methods and apparatus for making stereoscopic pictures, and particularly stereoscopic motion pictures. In general, as is well known, stereoscopic pictures are produced by making two or more pictures of an object, or more generically of a scene, each showing the scene as it appears from a viewpoint slightly different from that of the other picture or pictures. When two pictures so taken are seen through an ordinary stereoscope, one through one, and the other through the second eye of an observer viewing them, the observer obtains a visual effect of depth, known as stereoscopic effect, which he cannot obtain from either picture viewed separately.

Instead of viewing the pictures taken from the different viewpoints simultaneously through a stereoscope, they may be projected alternately on a screen in such sufficiently rapid succession that by the persistence of vision relied upon in the projection of moving pictures, the observer will obtain a stereoscopic effect from his visual combination of the pictures taken from different viewpoints. While the theoretical possibility of thus producing moving pictures with a stereoscopic effect has long been known, and many different forms of apparatus for producing and projecting such pictures have been proposed from time to time in the past, none of the arrangements heretofore proposed has gone into general use or has been found sufficiently practical for such use.

In the arrangements most frequently proposed, heretofore, for taking stereoscopic pictures, two, or in some cases more than two, cameras slightly spaced apart from one another are employed to produce the pictures taken from the different viewpoints, though in some cases a single camera has been shifted back and forth between two positions, and used to photograph the scene in each position. Such arrangements are open to objection because of the duplication of cameras and films required in the one case, and because of the character of the provisions required for shifting the camera in the other case, and those objections are especially serious in the case of arrangements for taking motion pictures for screen projection with a stereoscopic effect. In an attempt to avoid these difficulties, particularly in the case of moving picture camera mechanisms, various arrangements of light reflectors or prisms have been proposed for use in conjunction with a single camera. All such prior arrangements of which I have knowledge, however, have been objectionable because of their complications in construction and operation, their inherent expense of construction, and their operative defects and insufficiencies.

While the lack of practical success had with previously proposed arrangements for taking and projecting motion pictures with a stereoscopic effect is explainable in part by the complications and defects in construction and operating characteristics of the apparatus, all prior arrangements known to me have been vitally defective because of the failure of their designers to realize the limitation on the magnitude of the stereoscopic effect obtainable which is imposed by practical conditions. All prior arrangements for taking stereoscopic pictures of which I have knowledge, have been devised and adapted for use with an angular difference between the directions from which the different viewpoint pictures to be combined are taken, which is substantially greater than that which I have found suitable for use in taking pictures for screen reproduction with a stereoscopic effect. In general it has heretofore been believed or assumed that said angular distance should be equal to or greater than that obtained when the viewpoints are separated by the ordinary pupillary distance of 2½ inches or so, i. e. the distance between the lens axes of the two eyes of an ordinary adult. I have found, however, that, for screen reproduction with the usual magnification of the projected image, the said angular difference should not exceed that corresponding to a distance between viewpoints which is not greater than a small fraction of an inch.

The vital practical necessity for a distance between the different or apparent viewpoints which is only a small fraction of what has previously been considered desirable, arises from the fact that in practice the scene portrayed has depth, and different objects or significant points of the scene, are necessarily at different optical distances from the camera lens and film. In practice, the formation of images from different viewpoints on a projection film, no matter how the latter may be produced, results in a lateral displacement on the film of images taken from one viewpoint relative to images taken from the other viewpoint. Insofar as concerns the images of objects or point of the scene in some one plane optically parallel to the film or image receiving plane, which may be called the tracking plane, it is possible by making a certain tracking adjustment to produce a projection film, in which those images are in register, so that the successively taken images from the different viewpoints will properly register or track on the projection screen. Such a tracking adjustment which is right for a scene point or object at one optical distance from the lens, however, will be insufficient for scene points or objects optically nearer to the camera lens, and will be too great to secure tracking of images of scene points or objects optically more remote from the lens.

I have found, however, that by making the distance between the viewpoints much smaller than has heretofore been believed, or assumed, to be necessary or desirable, and by effecting such tracking adjustments as to keep the maximum separation on the projection film of the different viewpoint images of any important point or object of the scene suitably small, a significant and desirable stereoscopic effect can be obtained, while at the same time avoiding the "side weave" or "shake" which is an inherent result of the use of prior arrangements for producing stereoscopic motion pictures of scenes of any ordinary depth.

While various camera arrangements may be employed in making different viewpoint pictures to be combined in accordance with the present invention for the projection of motion pictures with the desired stereoscopic effect, I preferably make use of a camera mechanism especially devised by me for the purpose. The mechanism comprises a motion picture camera proper which may be of standard construction, and which has combined with it a simple continuously rotating light deflecting element. The latter, in its preferred form, comprises reflecting surfaces located in planes transverse to the axis of rotation of the element and separated from one another by a suitably small distance. The axis of rotation of said element, and the reflecting surfaces thereof, are so disposed relative to the optical axis of the camera lens system, that as the element rotates, the said surfaces intercept the said optical axis successively and at different distances from the lens, the image reflected by each reflecting surface when it so intercepts said axis being exposed and subsequently fixed on the camera film. In practice the planes of the reflecting surfaces are inclined at an angle of 45° to the optical axis, and are spaced apart by a distance equal to a small fraction of an inch. While this distance may vary with conditions, and the rotating element may well be so constructed as to permit of some adjustment thereof, I note that with a separation distance of two-tenths of an inch, I have obtained practically satisfactory results in the production of pictures for projection on a twenty foot screen, i. e. for projection with a magnification factor of approximately two hundred and forty.

The previously mentioned tracking adjustment brings into register on the projection film, and hence on the screen reproduction of the latter, the different viewpoint images of each scene point in a tracking scene plane optically transverse to the optical axis of the camera and located at a particular optical distance from the camera lens. The extent of the tracking adjustment and the distance of the tracking plane from the camera lens are mutually related and dependent on one another, so that the fixing or determination of either necessarily fixes and determines the other.

The tracking adjustment ordinarily will be less than that required to bring into register on the projection film the different viewpoint images of scene points nearer the camera lens than those in the tracking plane, and will be greater than that required to bring into register on the projection film images of scene points more remote than the tracking plane from the camera lens. In consequence, the tracking adjustment does not prevent some "shake" or "side weave" in the screen reproduction of the different viewpoint images of objects or scene points not on the tracking plane. I have found, however, by extensive and repeated experimentation and observation, that if the maximum displacement on the screen of the different viewpoint images of any significant foreground or background scene point does not exceed a certain distance, the corresponding shake or side weave is not seriously objectionable, and in fact is not noticeable by the ordinary screen observer. Thus in the screen reproduction of pictures with the customary screen magnification factor of approximately 240 employed in the projection of pictures on a so-called twenty foot screen, the maximum displacement of the different viewpoint images on the screen may be approximately one half inch without creating a shake or side weave effect which is practically objectionable, or noticeable by the ordinary screen observer.

To minimize the maximum displacement on the screen of foreground and background scene point images, the tracking adjustment should be such as to make the maximum lateral displacement of the different viewpoint images of the significant foreground scene point nearest to the camera lens equal to the maximum displacement of the different viewpoint images of any significant scene point most remote from the camera lens. If the planes parallel to the tracking planes containing the said nearest and most remote significant scene points be designated as the foreground and background planes, respectively, the desired value of the maximum image displacement on the screen is obtained when the ratio of the distance between the camera lens and the tracking plane to the distance between said lens and the said foreground plane, is equal to the ratio of the distance between said lens and the said background plane to the distance between the tracking plane and the lens. It seems to me probable that the maximum displacement of different viewpoint images, which as I have said, may be about a half inch when the images are projected onto a twenty foot screen, may be increased when the screen and the corresponding projection magnification factor are larger, and should be smaller when the screen and corresponding magnification factor are smaller, but I have so far lacked opportunity for a conclusive experimental verification of my belief on this point.

In practice, I prefer to effect the above mentioned tracking adjustments not in the production of the camera film on which the different viewpoint images of the scene are initially exposed and fixed, but in reproducing the camera film images on a screen production film, though it is possible to make the tracking adjustment in other ways. In particular, the adjustment may be made in the camera film by laterally shifting the camera film relative to the camera lens between the exposures thereon of successively formed different viewpoint images, and in such case the screen projection film may be the camera film or a direct reproduction thereof.

In the practical method of effecting the tracking adjustment in the production of a projection screen which I now consider preferable, I make use of a printing mechanism having provisions for lateral adjustment of the lens of the printing mechanism relative to its film positioning means for the small distance of a thousandth of an inch or so ordinarily required. In using this printing mechanism, I ordinarily first run the camera film and projection film through the mechanism by successive feeding steps of such length that successive images formed from one viewpoint are successively reproduced on spaced apart portions of the projection film without exposure of intermediate portions thereof. I then laterally adjust the lens of the printing mechanism relative to the film positioning means as required for the desired tracking adjustment, and then feed the films through the mechanism a second time to reproduce second viewpoint images of the camera film on the previously unexposed portions of the projection film. If the camera film is formed with images from three or more viewpoints, the described printing operation requires the feeding of the films through the printing mechanism three or more times with corresponding changes in the length of the individual film feeding movements. In general, however, I find that satisfactory results may be obtained with images on the camera film taken from two different viewpoints. The use of two viewpoints, rather than three or more, simplifies the required mechanism and procedure.

The angle between the axis of the bundle of light rays passing from a scene point to the camera lens and forming one viewpoint image on the camera film of said scene point to the axis of the bundle of rays passing from the same scene point to the camera lens and forming the second viewpoint image of said scene point on the camera film, is a function of the distance between the viewpoints, and may be, and is hereinafter referred to as the viewpoint angle. The relatively small maximum displacement on the projection screen of the different viewpoint images of the same scene point, which is a characteristic of the present invention, is made possible by and requires a corresponding relatively small viewpoint angle. Such viewpoint angle is substantially smaller than the angle between the axes of bundles of rays coming to the two eyes of an observer facing the scene point and directly viewing the latter, when at the same distance therefrom as is the camera lens.

The fact that, notwithstanding this difference in viewpoint angles, a substantial and satisfactory psychological effect is obtainable in the screen reproduction in accordance with the present invention, of different viewpoint images, is explainable perhaps, partly on physiological, and partly on psychological grounds. The psychological reaction I believe to be due to, or to involve a tendency on the part of the screen observer to effect a mental compensation for what he actually sees in accordance with his more or less unconscious realization of the fact that an object reproduced on the screen does not appear thereon in the same dimensions or scale as it would appear to an observer viewing the object directly from a distance at which the dimensions or scale of the object would correspond to those of the image on the screen. In considering the physiological reaction of the screen observer, account should be taken of the magnification of images in their screen reproduction. For example, with a particular camera mechanism and procedure involving dimensions and proportions which I have found practically successful, the displacement of the different view images formed on the camera film of an object located six feet from the camera lens, corresponds to a viewpoint angle equal to that which would exist in the case of the images formed in the two eyes of an observer directly viewing the object from a distance of about fifty-five feet. However, in the reproduction of the camera formed images of an object on a twenty foot projection screen, the linear dimensions of the image on the screen will be about seven times as great as those of the actual object. Thus, if the object photographed is a human head, the observed screen effect will be analogous, in part at least, to the effect obtained by an observer directly viewing at a distance of fifty-five feet, a sevenfold enlargement, in linear dimensions, of the actual head.

With the advantageously simple light reflecting means previously referred to for forming different viewpoint images, the scale dimensions of the image of an object formed by deflection from one mirror are slightly greater than the scale dimensions of the image of the object formed by reflection from the other mirror. Any tendency to shake in the screen production of the images due to this difference in scale dimensions, or other objectionable effects thereof, may be substantially reduced in the formation of a projection film in the general manner mentioned above by adjustment of the printing mechanism to enlarge or deduce the images reflected by one mirror relative to those reflected by the other. Such difference in the scales of the different viewpoint pictures results from the fact that the optical distance from any scene point to the camera lens is necessarily greater when the image of the point is reflected from one reflection plane than when reflected from a different plane parallel to the first plane. The ratio of the two optical distances between any scene point and the lens diminishes and increases, as said distances increase and diminish. In consequence, the compensating scale adjustment necessary to bring the different viewpoint images of scene points to the same scale varies with the general optical distance of the scene points from the camera lens. In general, however, the scale adjustment giving the best results is that which brings to the same scale the different viewpoint images of scene points in the tracking plane described above as ordinarily preferable. Therefore the desired scale and tracking adjustments may advantageously be effected simultaneously in reproducing the camera film images on the projection film in a copying camera or film printing mechanism. In such case the lens of the printing mechanism is adjusted not only in a direction parallel to the film planes, but also in a direction transverse to said planes, as required to secure the desired tracking relation of the different images in the projection film of similarly scaled images of scene points lying in the tracking plane.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:

Fig. 3 is a diagram illustrating certain optical characteristics of the camera mechanism shown in Figs. 1 and 2;

Fig. 3A is a reproduction on a larger scale of a portion of the diagram shown in Fig. 3;

Fig. 4 is a diagrammatic representation of a camera film exposed in the camera mechanism of Figs. 1 and 2;

Fig. 5 is a diagrammatic representation of a screen projection film formed from the camera film of Fig. 4, but differing therefrom as a result of a tracking adjustment;

Fig. 6 is a plan view of a printing mechanism for use in forming projection films from camera films and effecting tracking adjustments in the formation of the projection films;

Fig. 7 is a side elevation partly in section of the printing mechanism; and

Fig. 8 is an end elevation of the printing mechanism.

Figure 1:
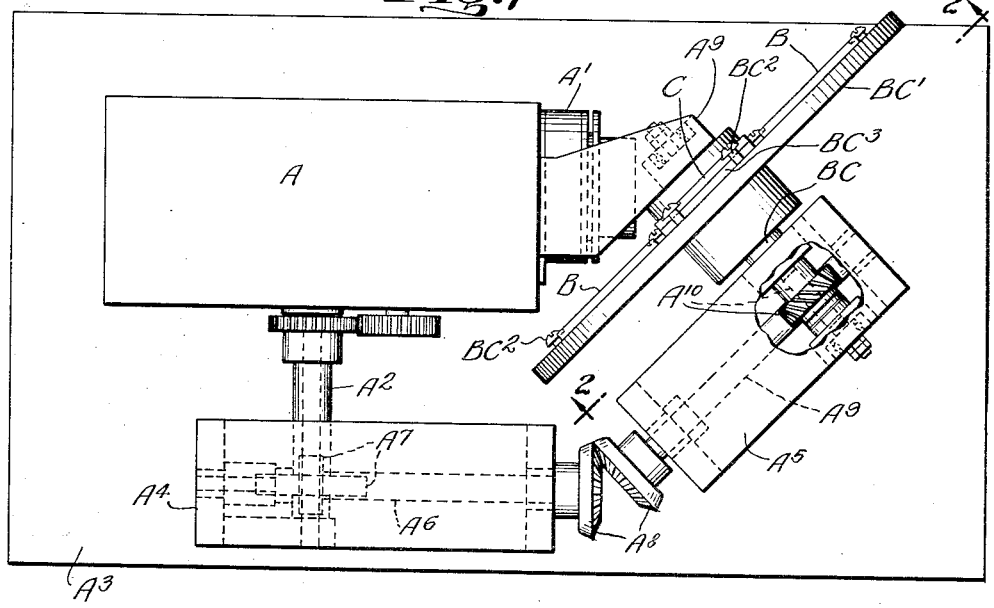
Fig. 1 is a plan view, and Fig. 2 an elevation partly in section on the line 2—2 of Fig. 1, of a camera mechanism for forming stereoscopic motion pictures.
Figure 2:
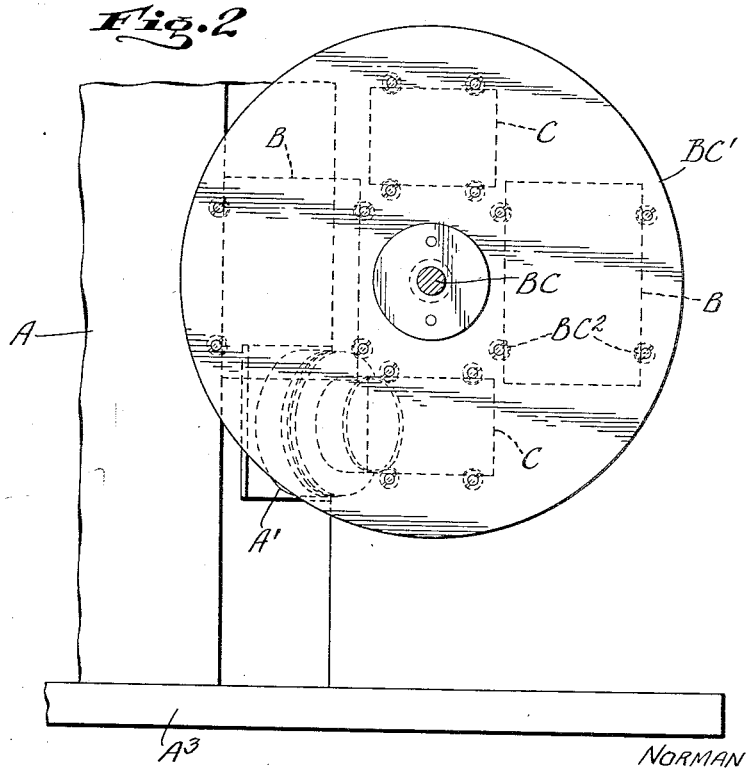

The camera mechanism shown in Figs. 1 and 2 comprises a camera A proper having a camera lens mounting A' and a shaft $A^2$. The latter may be connected to, or from the driving shaft for actuating the shutter mechanism and film feeding mechanism of the camera. It is unnecessary to illustrate and describe said mechanisms or other details of the camera A, because the latter may be any usual or suitable form of motion picture camera of which various forms are well known and in extensive use. The camera A is shown in Figs. 1 and 2 as mounted on a supporting base $A^3$, which also supports pedestals $A^4$ and $A^5$ providing shaft and gear supporting housings. The pedestal $A^4$ provides a mounting for the outer end of the shaft $A^2$ and for a transverse shaft $A^6$ connected to the shaft $A^2$, as by helical gears $A^7$, so that the rotation of the shaft $A^2$ produces a proportional rotation of the shaft $A^6$. The shaft $A^6$ is connected, as shown, by bevel gears $A^8$ to a shaft $A^9$ inclined at an angle of 135° to the shaft $A^6$. The shaft $A^9$ is journalled in the pedestal $A^5$ and is connected, as by helical gears $A^{10}$, to the transversely extending shaft BC of the light reflecting element which is associated with the camera mechanism for the purposes of the present invention.

The shaft BC is journalled at one end in the pedestal $A^5$, and at the opposite end in a bracket $A^9$ attached to the housing of the camera A. In the preferred form of construction illustrated in Figs. 1 and 2, the light reflecting element comprises in addition to the shaft BC, a disc BC' coaxial with the shaft BC and mounted on the latter intermediate its ends, and mirrors or reflectors B and C mounted on the side of the disc adjacent the camera lens. As shown, the reflectors B and C are in the form of rectangular plates clamped against the corresponding side of the disc BC' by screws $BC^2$. As shown, there are two reflectors B and two reflectors C. The two reflectors B are similar to one another and are symmetrically disposed at opposite sides of the shaft BC. The two reflectors C are also similar to each other, and are symmetrically disposed at opposite sides of the shaft BC, each being angularly interposed between the adjacent portions of the reflectors B. The reflectors B and C may be made of any suitable material, but I prefer to form them of some non-tarnishing metallic material, and recommend particularly their formation out of stellite or magnetic stainless steel. The magnetic property of the material last referred to is an advantage in the manufacture of the reflectors, since it permits the reflectors, when in the form of thin plates, to be suitably held against a supporting platen by magnetic attraction during the operation of grinding their reflecting surfaces.

In the camera mechanism shown in Figs. 1 and 2, the two mirrors or reflectors B are duplicates of one another, operatively as well as structurally, and the same is true of the two reflectors or mirrors C. The two reflectors B have their reflecting surfaces in the same plane transverse to the axis of the shaft BC and intercepting the optical axis of camera lens. Similarly the two mirrors or reflectors C have their reflecting surfaces in a plane parallel to that of the reflecting surfaces of the mirrors B.

For the purposes of the present invention, the two reflecting planes are spaced apart a slight distance. As shown the reflection plane separation is effected by making all of the reflectors in the form of plates of the same thickness, with the reflectors B clamped directly against the adjacent face of the disc BC', and with a shim $BC^3$ of suitable thickness interposed between each reflector C and the adjacent face of the disc BC'. In practice, I have obtained satisfactory results under widely varying conditions of operation with a shim thickness of two-tenths of an inch, but the separation of the two reflecting planes, which, with the construction described, is equal to the shim thickness, may be varied as conditions make desirable by replacing the shims $BC^3$ of one thickness with other shims of different thickness.

In the operation of the camera mechanism shown in Figs. 1 and 2, the rotation of the light reflecting element is so timed with reference to the operation of the camera shutter and film feeding mechanism, that during every other film exposure, the optical axis of the camera lens is intercepted by one or the other of the two mirrors B, and during the intermediate film exposures the optical axis is intercepted by one or the other of the mirrors C. This means with the mechanism shown that the light deflecting element need make but one complete rotation for each four shutter operations and film exposures. Since the reflecting surface of each mirror moves in its own plane during the period in which an image reflected by it is being exposed on the camera film, its rotative movement does not affect the form or character of the image formed.

In Figs. 3 and 3A, I have illustrated diagrammatically certain optical characteristics of the camera mechanism shown in Figs. 1 and 2. In Fig. 3, $b$ represents the reflecting plane of the mirrors B, and $c$ represents the reflecting plane of the mirrors C. For convenience of illustration and explanation, a scene point D to be photographed is shown in Fig. 3 as located on a line B'—D at right angles to the optical axis of the camera lens center $a$, which intersects the reflecting plane $b$ at the point B' and coincides with the line running from B' to $a$. In consequence, the image $bd$ on the camera film E of the scene point D formed by the reflecting action of a mirror B is at the intersection with the film of said axis.

The image $bd$ of the point D appears on the camera film E at the same point as it would appear if the mirrors were omitted and the point D were located at the point D' at which an extension of the line $a$—B' intercepts the line D—D' perpendicular to the mirror planes $b$ and $c$. The point D' is that at which the eye of an observer located at $a$ would see the image of the point D reflected by the mirror B. In accordance with the well known mirror law the point $D^4$ at which the line D—D' intercepts the mirror plane $b$ is midway between the points D and D'. Similarly the image of the point D formed on the film E by reflection from the mirror plane $c$ will be located on the film E at the same position in which it would be located if the mirrors were omitted and the point D were actually located at a point $D^2$ on the line D—D' and as far back of the plane $c$ as the point D is in front of that plane. The distance between the points D' and $D^2$ is double the perpendicular distance S between the two mirror planes $b$ and $c$.

From simple geometry it is apparent that the ratio of displacement from the image $bd$, of the image of the point D formed on the camera film by reflection from the plane $c$, to the perpendicular distance $D^2$—$D^5$ from the point $D^2$, to the line $a$—D', is equal to the ratio of focal length $f$ of the camera to the distance from the point $D^5$ to the lens center $a$. A tracking adjustment consisting in a lateral displacement of the camera film pictures formed by reflection from the plane $c$, relative to those formed by reflection from the plane $b$ in the proper direction, which is equal to the last mentioned image displacement, will insure exact tracking of the images of the point D formed by reflection from the two planes $b$ and $c$. In some cases such a tracking adjustment will also give a sufficiently close approximation to exact tracking for all other points in the plane DP perpendicular to the line DB'. Such a tracking adjustment cannot give exact tracking for all points in the plane DP, however, because of the differences between the scales of the pictures formed by reflection from the two planes. The image of an object or distance in the plane DP will be larger when reflected to the camera lens by the mirror plane $c$, than when reflected by the mirror plane $b$. This results from the fact that the optical distance from the lens center point $a$ to the point D by reflection from the plane $c$, is less than the optical distance by reflection from the plane $b$, and the same thing is true with respect to every other point in the plane DP.

This is apparent from Fig. 3 wherein the image points DA' and $DA^2$ bear the same relation to the point DA in the plane DP, as the image points D' and $D^2$ bear respectively to the point D. The length of the line D'—DA' is the same as the length of the line $D^2$—$DA^2$, but the image of the line D'—DA' formed on the film E by the camera lens is necessarily shorter than the correspondingly formed image of the line $D^2$—$DA^2$, because the latter is nearer to the camera lens than is the line D'—DA'.

Shake or lack of tracking register of images of scene points in the tracking plane or in any one plane parallel thereto, due to the above mentioned scale differences may be eliminated by suitably enlarging the scale of one, or reducing the scale of the other of the two pictures formed by reflection from the different planes. If, for example, scale differences in images of tracking plane objects or distances are eliminated by reducing the scale of the pictures formed by reflection from the plane $c$, in the reduced picture the location of the image of the point D will be the same as it would be in a picture formed on the film E by the camera lens with the mirrors B and C removed and with the point D located at the point $D^3$ at which the line D'—DA' perpendicular to the line $a$—D' is intercepted by the line $D^2$—$D^3$ parallel to the line $a$—D. The effect on image location of this picture scale reduction is the same for all points in the plane DP. Thus, for example, with the point $DA^3$ bearing the same relation to the point $DA^2$, as the point $D^3$ bears to the point $D^2$, the line D'—DA' is necessarily of the same length as the line $D^3$—$DA^3$, and the images of the two lines formed directly on the camera film E by the camera lens must be of the same length.

In Fig. 3, the line $D^3$—$a$ intercepts the film E at the point $cd$ and the displacement distance $xd$ between the film images $cd$ and $bd$ is the lateral tracking adjustment of pictures taken by reflection from the mirrors C, relative to pictures taken by reflection from the plane $b$, required to insure precise tracking for images of all points in the plane DP, when the pictures taken by reflection from the plane $c$ are reduced to the scale of the pictures taken by reflection from the plane $b$ as above described.

For convenience of illustration and description, I show in Fig. 4, a film EB which might be made from the camera film E, and which differs from the latter only in that pictures $E^2$, $E^4$, $E^6$, etc., formed by reflection from the mirrors C have been reduced to the scale of the pictures E', $E^3$, $E^5$, etc., formed by reflection from the mirrors B. In the film EB, the images $bd$ of the pictures E', $E^3$, $E^5$, etc. which are successively formed at alternate exposures by reflection from the mirrors B lie along a line laterally displaced from the line of the images $cd$ of the pictures $E^2$, $E^4$, $E^6$, etc. which are formed at intermediate exposures by reflection from the mirrors C.

In a screen projection directly from the film EB, the images $bd$ and $cd$ will not track, but will be laterally displaced from one another on the screen by a distance equal to the product of the film distance $xd$ multiplied by the screen projection magnification effect, which in the case of a twenty foot screen is approximately 240. The resultant shake or side weave may be eliminated, and tracking register of the screen reproduction of the images $bd$ and $cd$ may be secured by projecting the images from a projection film of the character of the screen EA of Fig. 5. The screen EA might be formed from the film EB and so as to differ therefrom only as a result of the tracking adjustment. The latter, in effect, displaces all of the images $cd$ laterally of the film EB relative to the images $bd$, by an amount equal to the distance $xd$, so that all of the images $bd$ and $cd$ of the film EA are on the same straight line parallel to, and between the side edges of the film. In the practice which I now consider preferable, I do not actually produce the film EB, but form the projection EA directly from the camera film in a copying camera which is adjusted as required to effect both the scale difference elimination and the tracking adjustment. In Fig. 3, $dd$ is the distance between the lens center $a$ and the line D'—$D^3$ and W is the distance between the points D' and $D^3$. The distance W is thus equal to the stereoscopic base or separation distance between two viewpoints, each approximately at the distance $dd$ from the scene point D, which would be required to obtain the stereoscopic effect obtainable by a suitably rapid screen projection of the successive images $bd$ and $cd$ of the film EA. Since the distance D'—$D^2$ is double the distance S between the reflecting planes $b$ and $c$, it follows that the distance W is equal to S multiplied by the square root of 2. Since the triangle D'—$a$—$D^3$ is similar to the triangle $bd$—$a$—$cd$, it follows that the tracking adjustment distance $xd$ is given in terms of W, $dd$, and the focal distance $f$ of the camera lens, by the equation $$xd = \frac{Wf}{dd}$$

The tracking adjustment which brings the different viewpoint images of scene points in the tracking plane DP into register on the projection film EA will not effect registration on the projection film of different viewpoint images of scene points at either side of the plane DP. Thus, while the image $bf$ formed by reflection from the mirror plane $b$ of a point F on the line B'—D between the points B' and D will coincide with the image $bd$, the image $cf$ of the point F formed on the camera film by reflection from a mirror plane $c$ will be displaced from the images $bd$ and $bf$ by a distance $xf$ which is greater than the distance $xd$ between the images $bd$ and $cd$. Similarly, while the image $bg$ formed by reflection from a mirror B of a scene point G on the line B'—D, but at a greater distance from the point B' than the point D, will coincide on the camera film with the image $bd$, the corresponding image $cg$, formed by reflection from the mirror plane $c$ will be displaced therefrom by a distance $xg$ which is less than the distance $xd$. In consequence, in the projection film EA formed with the above described tracking adjustment, the images $cf$ will lie on a line at one side, and the images $cg$ will lie on a line at the opposite side of the line along which the images $bd$, $cd$, $bf$, and $bg$ are located. The lateral displacement from the last mentioned line of the images $cf$ will be equal to the distance by which the image displacement $xf$ exceeds the tracking adjustment $xd$. Similarly, the lateral displacement on the film EA of the images $cg$ from the line of the images $bd$, $cd$, $bf$ and $bg$ will be equal to the distance by which the tracking adjustment $xd$ exceeds the image displacement distance $xg$.

In Fig. 3, PF and PG represent planes which respectively include the scene points F and G, and are each parallel to the tracking plane DP. In Fig. 3 also the lines F'—F³ and G'—G³ at distances $df$ and $dg$, respectively, from the lens center $a$, are equal in length and are parallel to the line D'—D³, and are related to the lens axis line $a$—D' and to the points F and G, respectively, as the line D'—D³ is related to the lens axis line $a$—D' and scene point D.

On the assumption that the scene points F and G lie in the foreground and background planes PF and PG which contain the significant scene points, respectively nearest to, and most remote from the camera lens, it is apparent that the minimum value of the maximum displacement will be obtained when the relation of the distances $xd$, $xf$ and $fg$ is that given by the following equation:

$$xf - xd = xd - xg$$

From the similar triangle relations shown in Fig. 3, it is apparent that the distances $xf$, $xd$ and $xg$ are in similar inverse ratio to the distances $df$, $dx$ and $dg$, respectively. It follows from the preceding equation, therefore, that $$\frac{1}{df} - \frac{1}{dd} = \frac{1}{dd} - \frac{1}{dg}$$

From the last equation, it follows that $$dd = \frac{2(df)(dg)}{df + dg}$$

As will be apparent from the foregoing explanations, the derived valuation of distance $dd$ in terms of the distances $df$ and $dg$ fixes the location of the tracking plane, and, therefore, the extent of the tracking adjustment required, for a minimum value of the maximum displacement on the projection film EA of the two different viewpoint images of any scene point appearing on the film and located in or between the scene intercepting planes PF and PG, nearest to and most remote, respectively, from the camera lens. It is thus quickly and easily possible to determine the proper location of the tracking plane for a minimum displacement of different viewpoint images on the projection film when the significant constants of the camera mechanism, to wit: the focal length $f$ and the distance S between the reflecting planes $b$ and $c$ of the mirrors B and C, are shown, and when the optical distances from the lens $a$ to the near and remote planes PF and PG are known. In photographing a large portion of ordinary motion picture scenes, it is possible to directly measure the last mentioned distances, $df$ and $dg$. In all cases, moreover, it is possible to determine those distances, and to thereby fix the desired location of the tracking plane, from measurements of the different viewpoint image displacements of foreground and background scene points on the camera film E.

From the explanations and equations given above, it will be apparent that with a camera mechanism having particular constants $f$ and S, a desirable minimum value (for example, of one half inch) for the maximum screen displacement of the different viewpoint images is obtainable only for some particular value of the distance $df$ between the camera lens and the near plane, FP of a scene of some particular maximum depth, and by depth as used herein, I mean the difference between the above mentioned distances $df$ and $dg$. As the depth of the scene photographed increases, the optical distance $df$ between the camera lens and the near plane PF must be increased to avoid an excessive maximum displacement of different viewpoint images on the projection film unless the camera mechanism is changed or adjusted. It is possible, however, to maintain the same maximum displacement of the different viewpoint images of any scene point as the depth of the scene is increased while the distance $df$ remains constant, by a corresponding reduction in the distance S between the reflection planes. Adjustment of the distance S is objectionable, however, because it adds complication to the camera mechanism and operative procedure, and diminishes the stereoscopic effect obtained. In general, moreover, it is desirable as the distance $dg$ is increased to increase the distance $df$, and thereby minimize both the ratio of the distances $df$ and $dg$, and the scale differences between foreground and background images.

By way of illustration, rather than of limitation, I note that with a camera of a focal length of two inches, and with the planes of the mirrors B and C .02 of an inch apart, I have obtained good stereoscopic screen results in photographing and projecting scenes varying in depth and with image displacements as indicated in the following table, wherein the terms of $df$, $dg$, $dd$, $xd$, $xf$ and $xg$ are used as they have been previously used herein, and wherein M. F. D. designates the maximum displacement on the projection film, and M. S. D. designates the maximum displacement on a twenty foot screen of the different viewpoint images of any scene point, and wherein the distance unit is an inch, and the figures in each horizontal row pertain to a single scene.

| df | dg | dd | xd | xf | xg | M.F.D. | M.S.D. |
|---|---|---|---|---|---|---|---|
| 48 | 72 | 57.6 | .00979 | .01175 | .00783 | .00196 | .470 |
| 60 | 96 | 73.8 | .00763 | .00940 | .00323 | .00186 | .425 |
| 78 | 174 | 107.7 | .00523 | .00723 | .00122 | .00177 | .480 |
| 96 | 300 | 145.4 | .00388 | .00587 | .00095 | .00200 | .480 |
| 120 | 804 | 208.8 | .00270 | .00470 | .00070 | .00200 | .480 |

In Figs. 6, 7 and 8, I have illustrated the distinctive characteristics of a printing or copying camera mechanism successfully used by me in forming such a projection film as is shown in Fig. 5, from such a camera film as is shown in Fig. 4. This printing apparatus comprises a base I, on which is mounted a copying lens support J, a device $k$ for supporting a camera film feeding mechanism, and a generally similar device K for supporting a projection film feeding mechanism.

As shown, the lens support J comprises a base member J' formed at its opposite sides with guideways or slots $J^2$ facing one another and receiving the parallel opposite side edges or guide-ribs I' at the opposite sides of the upper portion of the base member I. A clamping screw $J^3$ is threaded through the wall of one of the guideways $J^2$ for clamping engagement with the edge of the corresponding rib I' to lock the member J in any desired adjustment longitudinally of the ribs I'. When the screw $J^3$ is released the member J' may be adjusted along the guide-ribs I' by means of a shaft $J^4$ mounted on the member J' and carrying a spur gear $J^5$ in mesh with a rock bar $I^2$ carried by the base I.

The member J' carries an uprising bracket $J^6$ which supports an upright plate-like member $J^8$ formed with vertical guideways $J^9$ for a carriage $J^{10}$ which supports the copying lens mounting $J^{11}$. A vertical adjusting screw $J^{12}$, swiveled in a bracket-like extension from the member $J^8$, passes through a threaded socket in a projecting portion $J^{13}$ from the carriage $J^{10}$ and forms a means for vertically adjusting the latter. Advantageously and as shown, the supporting base $J^{14}$ for the lens mounting $J^{11}$ is horizontally adjustable in guideways $J^{15}$ on the member $J^{10}$, and may be adjusted in said guideways by an adjusting screw $J^{16}$ swiveled in the member $J^{10}$ and passing through a threaded socket in a bracket portion $J^{17}$ of the member $J^{10}$.

The projection film supporting device K comprises a base member K' having guide slots $K^2$ and a clamping screw $K^3$ similar to the parts $J^2$ and $J^3$, respectively, to provide for adjustment of the member K' along the base guide-ribs I'. An adjusting screw $K^4$, swiveled in a bracket carried by the base member I and passing through a nut portion $K^5$ mounted on the base member I, forms a convenient means for moving the base member K' along the guide-ribs I' when the clamping screw $K^3$ is loosened. The device K comprises a member $K^6$ resting on the upper side of the member K' and pivotally connected thereto to turn about a vertical axis. As shown, the pivotal connection comprises a pivot $K^7$ carried by the member K' and received in a socket formed in the member $K^6$. $K^8$ represents clamping screws for positively securing the member $K^6$ to the member K' in any relative adjustment of the parts. As shown, the screws $K^8$ are tapped into the body member K' and have their body portions received in openings formed in the member $K^6$ and suitably enlarged to accommodate the required slight angular adjustment of the body portion $K^6$ about the pivot $K^7$. Mounted on top of the body portion $K^6$ is the upper member $K^9$ of the device K. The member $K^9$ has beveled edges received between undercut guide surfaces $K^{10}$ of the member $K^6$ which extend transversely to the guide-ribs I'. An adjusting screw $K^{11}$ swiveled in a bracket portion of the member $K^6$ and passing through a nut portion $K^{12}$ of the member $K^9$, forms a means for adjusting the latter in the direction of the guide surfaces $K^{10}$.

The camera film supporting device $k$ may be, and is shown as precisely like the projection film supporting device K, in respect to the above described features of the latter, except that, as shown, the device $k$ is not provided with an adjusting screw corresponding to the adjusting screw device $K^4$ of the device K. The corresponding parts of the devices K and $k$ are designated by reference symbols K and $k$, respectively, with similar exponents.

To facilitate accurate relative adjustment of the devices K and $k$, I employ an adjustable distance member L extending between swiveled vertical posts $K^{13}$ and $k^{13}$ carried by the devices K and $k$, respectively. The distance member L as shown comprises a body member having aligned sockets formed in its opposite ends and internally threaded to receive oppositely threaded members L' forming adjustable end portions of the member L. The enlarged head $L^2$ of each end portion L' is formed with a bearing snugly receiving the corresponding posts $K^{13}$ or $k^{13}$.

In making use of the apparatus shown in Figs. 6, 7 and 8, a film feeding and positioning mechanism including a shutter mechanism is mounted on each of the supporting devices K and $k$, and the two film feeding mechanisms with their shutters are connected to suitable mechanism which drives them in synchronism. I have not thought it necessary to illustrate and describe the film feeding mechanism in detail herein, as those mechanisms and the associated driving mechanism may be of any usual or suitable type employed in copying cameras, of which various forms are well known and in use. The film feeding mechanism employed by me need differ from those of the most commonly employed only in that each such mechanism used by me is arranged to advance the film at each feeding operation a film length equal to two film picture or exposure lengths, so that on each movement of the film through the mechanism the portions of the film which are thereby exposed alternate with similar portions which are not exposed. The modification of a standard copying camera film feeding mechanism to obtain the special feed required by me, may be readily made by anyone familiar with such mechanisms, especially as the film feeding mechanisms for advancing films through cameras so as to expose portions alternating with unexposed portions of the same length are already known.

With the copying camera or printing mechanism shown in Figs. 6, 7 and 8, it is readily possible to make the adjustments required for the previously described tracking adjustment and for the enlargement or reduction in scale of the pictures taken from one viewpoint, with a high degree of precision. The reduction of the scale of the pictures taken from one of the two viewpoints may be effected by increasing the distance between the devices K and J relative to the distance between the devices J and $k$. This adjustment may be effected with any desired degree of precision by a movement of the device K suitably decreasing its distance from the device k, and by a smaller focussing movement of the device J away from the device k. In practice, however, with the small reduction in scale required and the character of the copying lens ordinarily employed, the scale reduction may ordinarily be effected with suitable accuracy by an adjustment of device J without disturbing the position of the device K. The tracking adjustment may be made in practice with sufficient accuracy by adjusting either the lens mounting $J^{11}$ or the part $K^9$ of the device K transversely of the length of the base member I. Owing to the small tracking adjustment distance of a few thousandths of an inch at a maximum there is a certain practical advantage in effecting the tracking adjustment by adjustment of the part $K^9$ rather than of the part $J^{11}$, since the adjustment movement of the part $K^9$ required is approximately double that which must be given to part $J^{11}$, and the increase in the amount of actual adjustment tends to diminish the percentage error in effecting such adjustment.

While the copying camera or printing mechanism shown in Figs. 6, 7 and 8 which has been illustrated and described in detail, is of a form which I have found practically desirable for the purpose, those skilled in the art will recognize that copying cameras of other forms may be used in the practice of the present invention. Moreover, the tracking adjustment itself need not be effected in a copying camera, but may be effected in other ways. For example, it may be effected by a lens adjustment in the camera in which the original camera film is exposed as may be seen from Fig. 3. In that figure, the line connecting the image point $bd$ and the point $D^2$ intersects the plane $a$—$a'$ normal to the lens axis line $a$—$D'$, at the point $a'$. If the camera mechanism be provided with means for shifting the camera lens between successive exposures so that it occupies the position shown in Fig. 3 when images reflected by the mirrors B are being formed, and occupies the position in which its center coincides with the points $a'$, when images reflected by the mirrors C are being formed, the different viewpoint images of the point D on the tracking plane would register on the camera film except for lack of register due to scale differences in the different viewpoint pictures. In such case the shifting adjustment of the lens would effect a tracking adjustment and no further tracking adjustment in the printing operation would be required if compensation for scale differences is not to be made. The tracking adjustment by such a lens shifting operation is ordinarily less desirable than the previously described tracking adjustment effected in the printing operation, because it involves an undesirable complication in the camera mechanism. It is open to a further objection, moreover, in that it results in a somewhat smaller stereoscopic effect for a given distance between the reflecting mirrors than is obtainable with the procedure first described. This becomes plainly apparent when account is taken of the fact that the angle $D'$—$a$—$D^2$ is greater than the angle $D'$—$bd$—$D^2$.

In the previous references herein to significant foreground and background image points or objects, I refer to image points and objects of sufficient relative prominence to make their appearance and location on the screen noticeable and of real practical importance from the standpoint of the general screen effect. As those skilled in the art will understand, screen images of scene points or objects appreciably more remote from the camera lens than the more prominent scene points and images to which the attention of the screen observer is primarily attracted are ordinarily seen or observed by the screen observer only in a general and rather indistinct manner, even though the camera employed is not sharp focussing. In practice, I find it generally advantageous in photographing and reproducing scenes of considerable depth in respect to the location of their significant points or objects, to employ in a taking camera lens which is not especially sharp focussing. In any event, however, "side weave" or shake of relatively remote and significant background point or object images is relatively unimportant, and need not be taken into account in determining the proper tracking adjustment. In general, in taking pictures in the practice of the present invention the camera should be focussed on objects located in or near the tracking plane.

The preferred mode of practicing the present invention hereinbefore described possesses an important practical advantage in that it minimizes the adverse effects or irregularities in films and film feeding mechanism such as result from the fact that one film strip frequently differs from another as a result of unequal expansion and contraction of the two films occurring in their manufacture and use, or as result from irregularities in the punching of the sprocket teeth receiving orifices in the film margins, as well as from non-uniformity in different film feeding mechanisms.

My invention possesses important practical advantages because of the fact that both the taking camera proper and the projector may be of any usual standard construction. Furthermore the light reflecting element which I add to the camera proper is very simple in construction and reliable in operation.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In making pictures of a scene for screen projection so that a screen observer may visually combine different pictures of said scene and thereby obtain a stereoscopic effect, the improvement which consists in reflecting images of said scene through a taking camera lens from parallel mirror planes separated by a distance of not more than two-tenths of an inch but large enough to produce a significant difference in the relative positions of the same scene points in the images reflected from the different planes onto successively exposed portions of a camera film and forming a projection film from said camera film by a photographic reproduction process which includes the step of modifying the scale of the images of the set reflected from one plane to minimize scale differences between the sets of images reflected by the different planes, and the step of shifting the images of one set laterally of the projection film relatively to the images of the other to thereby minimize the lateral displacement of different viewpoints of the same scene points.

2. In apparatus for making stereoscopic pictures, the combination with a camera having a single lens system, of means for reflecting different viewpoint images of the same scene through said lens system, said means consisting of a single rotating element including rigidly connecting mirrors having their reflecting planes transverse to the axis of rotation of said element and displaced longitudinally thereof of the order of two-tenths of an inch, said mirrors being displaced angularly about said axis and said element being so disposed relative to said system so that as the element rotates the said mirrors successively intercept the optical axis of said system.

3. In making pictures of a scene for screen projection so that a screen observer may visually combine different pictures of said scene and thereby obtain a stereoscopic effect, the improvement which consists in taking the different pictures so combined from different viewpoints which are separated from one another by a distance which is of the order of three-tenths of an inch.

4. In making pictures of a scene for screen projection so that a screen observer may visually combine different pictures of said scene and thereby obtain a stereoscopic effect, the improvement which consists in reflecting images of said scene through a taking camera lens alternately from parallel mirror planes separated by a distance of not more than two-tenths of an inch but large enough to produce a significant difference in the relative positions of the same scene points in the images reflected from the different planes.

5. In making pictures of a scene for screen projection so that a screen observer may visually combine different pictures of said scene and thereby obtain a stereoscopic effect, the improvement which consists in reflecting images of said scene through a taking camera lens alternately from parallel mirror planes separated by a distance of not more than two-tenths of an inch but large enough to produce a significant difference in the relative positions of the same scene points in the images reflected from the different planes and reproducing said images on a projection film with enlargement or reduction of one set of images to eliminate scale differences between those images and the images of the other set.

NORMAN H. BROCK.